Dec. 22, 1959   R. O. BRADLEY   2,918,268
FLEXURE RIBBON GUARDS
Filed March 4, 1957   4 Sheets-Sheet 1
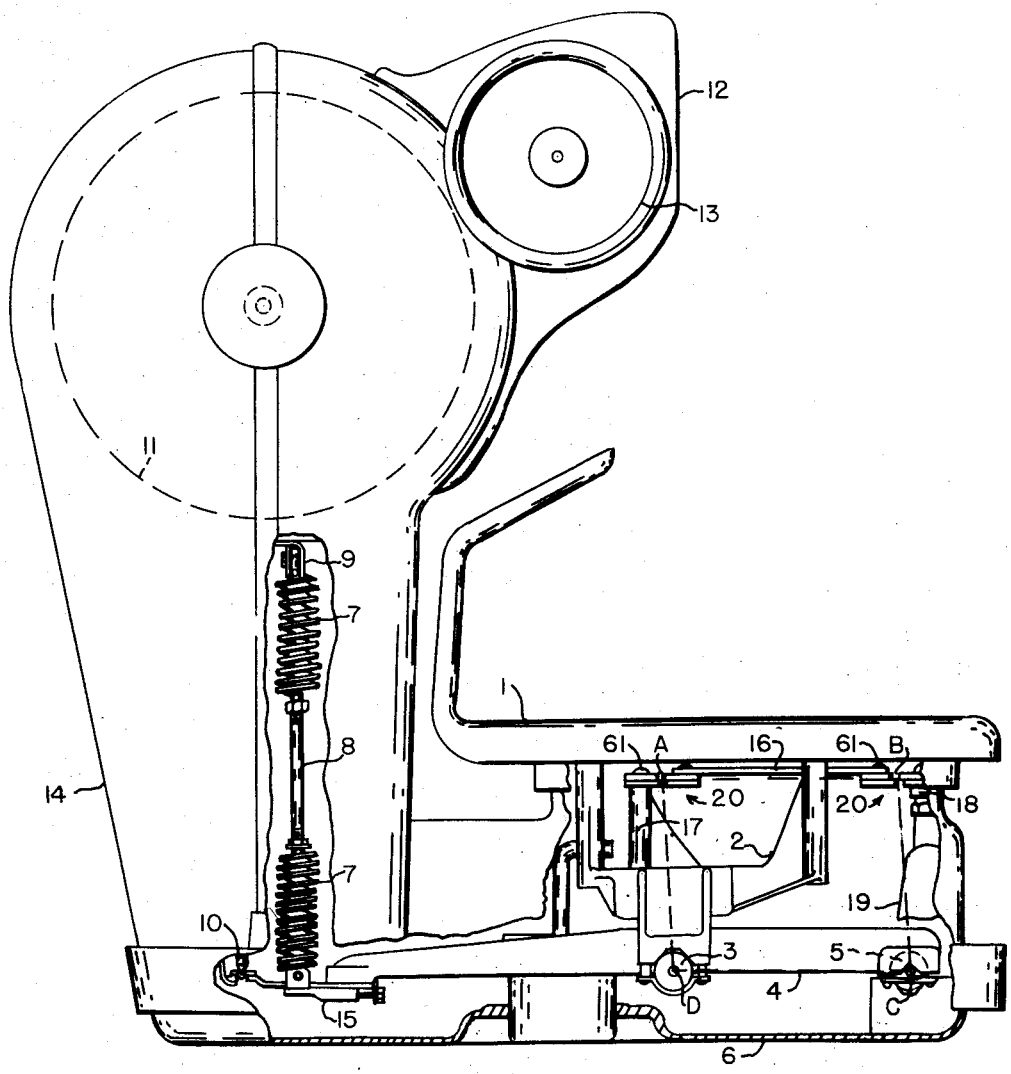
Fig. I
INVENTOR.
ROBERT O. BRADLEY
BY
Marshall, Marshall & Yeasting
ATTORNEYS

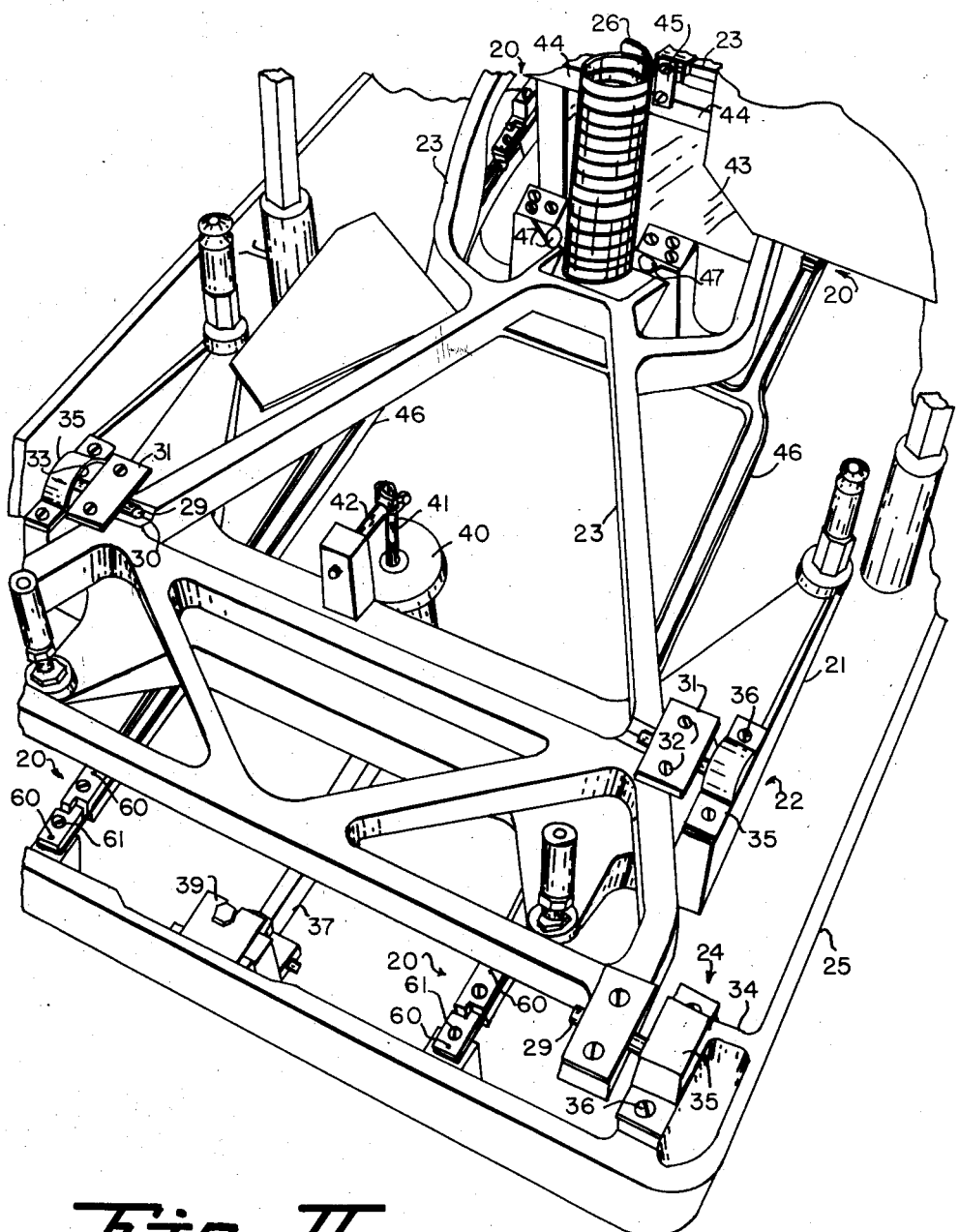
Fig. II

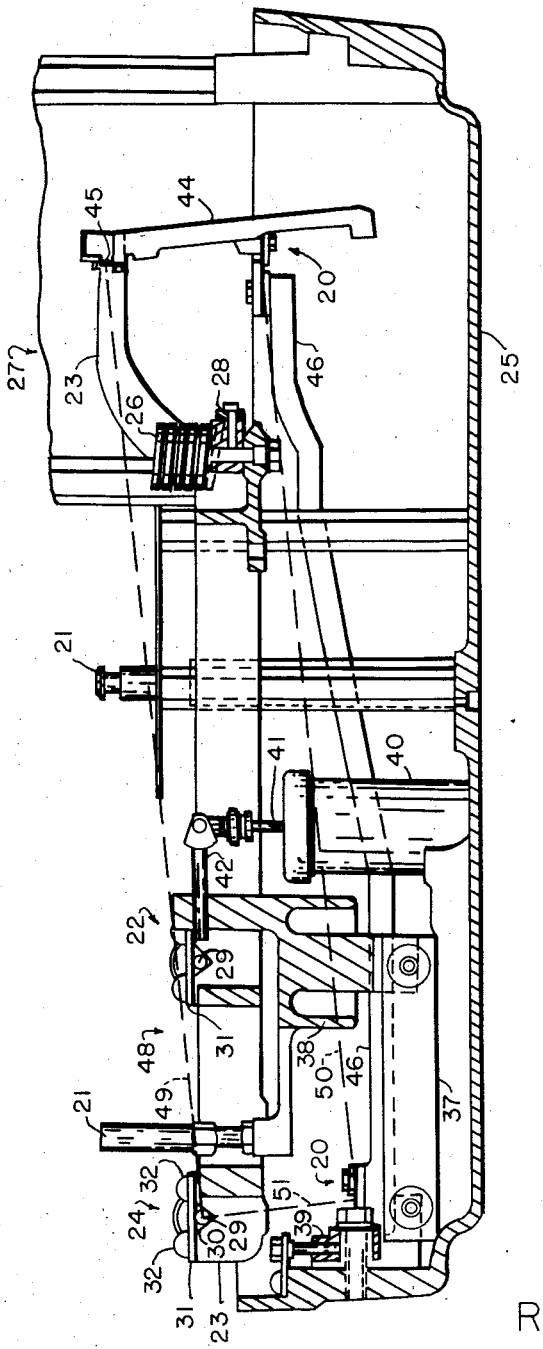

Dec. 22, 1959     R. O. BRADLEY     2,918,268
FLEXURE RIBBON GUARDS
Filed March 4, 1957     4 Sheets-Sheet 4
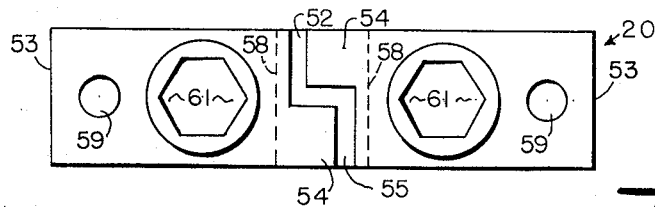
*Fig. IV*
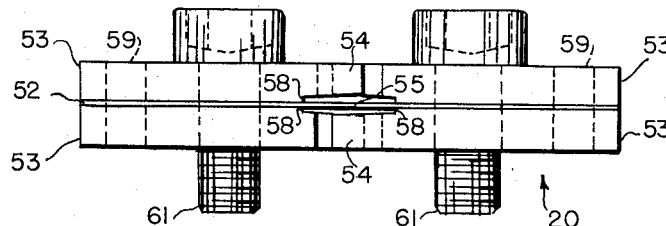
*Fig. V*
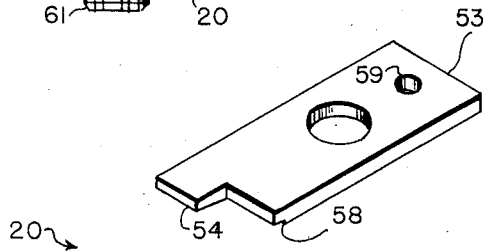
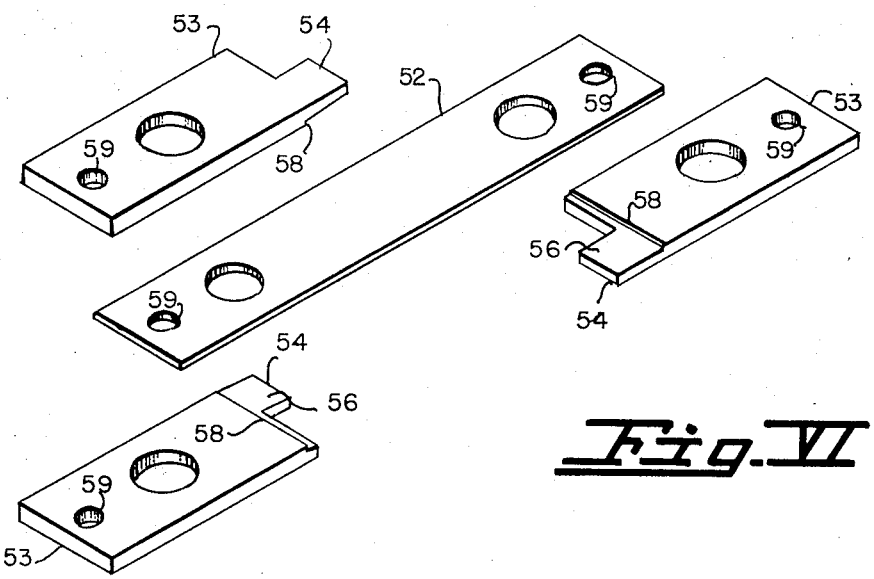
*Fig. VI*
INVENTOR.
ROBERT O. BRADLEY
BY
Marshall, Marshall & Geasting
ATTORNEYS United States Patent Office 2,918,268
Patented Dec. 22, 1959

2,918,268

FLEXURE RIBBON GUARDS

Robert O. Bradley, Toledo, Ohio, assignor, by mesne assignments, to Toledo Scale Corporation, Toledo, Ohio, a corporation of Ohio Application March 4, 1957, Serial No. 643,773

6 Claims. (Cl. 265—27)

This invention relates to improvements in weighing scales and more particularly to improved guards or reinforcing means for flexure ribbons which may be used as pivotal connections in weighing scales.

Flexure ribbons are used as thin flexible joints to pivotally mount movable members such as indicators, levers, and check stays or links in weighing scales. The flexure ribbons may be protected by guards to prevent buckling of the ribbons under unusual forces, the guards functioning additionally as reinforcing means in constant contact with end portions of the flexure ribbons but being spaced from center portions or zones of flexure of the ribbons to permit the ribbons to bend within limits. Prior guards, however, were not entirely satisfactory because no definite lines of demarcation were provided between the end and center portions of the flexure ribbons. This caused the prior flexure ribbons to have indeterminate flexing points or zones of flexure which leads to the destruction of the usual weighing scale parallelogram structure when such ribbons are used as pivotal mountings for levers or check links, causing in turn inaccurate weighing results.

It is accordingly, the principal object of this invention to provide a flexible joint member with an improved guard to provide a determinate and constant zone of flexure and to prevent buckling of the member.

Another object of the invention is the provision of an improved weighing scale using, as pivotal connections, flexure ribbons that have determinate bending spans.

Other objects and advantages will be apparent from the following description in which reference is made to the accompanying drawings.

According to the invention, each of the improved guards is provided with an area which is so spaced from the flexure ribbon, which is protected against buckling by the guard, that a sharp edge is provided as a take-off line for the ribbon, i.e., there is provided a definite edge about which the ribbon can flex. Such sharp edge insures that the effective flexing point of the ribbon is determinate and that the bending span of the ribbon remains constant during normal usage.

A preferred embodiment of the invention is illustrated in the accompanying drawings.

In the drawings:

Figure I is a side elevational view with parts broken away to show the improved pivotal connections as mounting means for a check link in their relative positions in a weighing scale suitable for use in a retail market;

Figure II is a fragmentary perspective view illustrating the improved pivotal connections as mounting means for a lever in their relative positions in a second weighing scale suitable for use in a retail market;

Figure III is a vertical central sectional view as seen from a position at the right of Figure II looking toward the weighing scale, the upper parts of the scale and certain adjuncts being broken away;

Figure IV is an enlarged plan view of one of the flexible connections which are shown in Figures I, II and III;

Figure V is a side elevational view of the flexible connection which is illustrated in Figure IV; and Figure VI is an exploded view of the flexible connection which is illustrated in Figures IV and V, the screws being omitted for clarity of illustration.

These specific figures and the accompanying description are intended merely to illustrate the invention and not to limit its scope.

Referring to Figure I, the force of gravity acting on a load placed upon a load receiver or platter 1 is transmitted through a spider 2 and load bearings 3 to a lever 4 fulcrumed on bearings 5 and a base 6 of the scale. These load forces acting on the lever 4 are transmitted to a load counterbalancing spring 7, divided into an upper and lower section by an intermediate strut or tension member 8. The upper end of the spring is connected through a clamp 9 to a portion of the frame of the weighing scale.

The extension of the spring 7, which is proportional to the load on the scale, permits the spring supported end of the lever 4 to drop a distance proportional to the load and this movement is transmitted through a linkage including a strut 10, a cross lever, a rack, and pinion (not shown) to rotate a cylindrical chart 11 through equal increments of angle for equal increments of load on the scale. The chart 11 is provided with indicia that may be viewed through a window 12 and a magnifying lens (not shown) which is positioned along a path parallel to the axis of the chart 11 by means of a hand wheel 13. The chart 11 and the mechanical connection between the chart and the lever is enclosed in a housing 14 erected from the rear portion of the base 6 of the scale and including a generally cylindrical shell encasing the chart 11.

Since it is usually impossible to wind springs to have exactly a certain load carrying capacity at a certain extension, means are provided in a form of an adjustable nose iron 15 attached to the lever 4 to vary the connection point between the spring 7 and the lever 4. Thus, if the spring 7 is too stiff, the nose iron 15 is moved toward the fulcrum of the lever 4 thereby increasing the force applied to the spring and thereby increasing the deflection for a given unit of a load placed upon the load receiver 1. Conversely, if the spring is too weak such that the spring extension or movement of the lever 4 and strut connection 10 is too great for the correct indication of load the nose iron 15 may be moved to the left, away from the fulcrum axis, to increase the mechanical advantage of the spring 7 and, thus, reduce its extension for a given load applied to the load receiver 1. The zero position of the chart 11 is adjusted by an adjustable connection in the drive between the strut 10 and the rack and pinion that drives the chart.

The spider 2 supporting the load receiver is held in upright position by a check link 16 having one end pivotally connected to a post 17 of the spider and having its other end pivotally connected to an adjustable upper section 18 of a check link post 19 erected from the frame or base 6 of the scale. The pivotal connections for the check link 16 comprise flexible joints 20 which are hereinafter described in detail.

Any weighing scale having a platter located above a lever and supported from a pair of aligned knife edges, or a single extended knife edge of the lever, or from a pair of aligned ball bearings, like the load bearings 3, requires a check stay or link, like the link 16, to keep the platter in position. In order that the scale shall weigh accurately for all positions of the load upon the platter, it is necessary that the effective length of the check link be exactly equal to the distance between the fulcrum and load pivots of the lever and that the check link be exactly parallel to the pivot line of the lever for all positions occupied by the lever during normal weighing operations. Lines drawn, in Figure I, between the centers of the bearings 3 and 5 and between the axes of flexure of the flexible joints 20 of the check link 16 and lines drawn from the center of the bearing 3 of the axis of flexure of the pivotal connection of the check link to the post 17 and from the center of the bearing 5 to the axis of flexure of the pivotal connection of the check link to the post 19 form the sides of a parallelogram ABCD.

Prior flexible joints for check links had indeterminate flexing points or bending spans that were changed by bending around a radius which led to the destruction of the parallelogram design. If the parallelogram ABCD in Figure I were destroyed, an object placed upon the platter 1 in one place would have a different indicated weight from the same object placed upon the platter 1 in a different place or position. To prevent such destruction of the parallelogram ABCD, the flexible joints 20 are so constructed as hereinafter described that their bending spans remain constant during all positions occupied by the check link 16 during normal weighing operations.

The flexible joints 20 in addition to being suitable for pivotally mounting a check stay or link are well suited for pivotally mounting a lever as illustrated in Figures II and III. Referring to Figures II and III, the force of gravity acting on a load placed upon a platter which is not shown but which is like the platter 1 shown in Figure I is transmitted through a spider 21 and load bearings 22 to a second class main lever 23 fulcrumed on bearings 24 in a base 25 of a projected indication weighing scale. These load forces acting on the lever 23 are transmitted to a helical load counterbalancing spring 26 which is connected at its upper end to a frame 27 of the scale and at its lower end through a calibrator clamp 28 to the end of the lever 23.

Each of the bearing connections comprises a stud 29 that is positioned in a transverse groove 30 milled in the lever 23 and clamped by a cover plate 31 attached to the lever by means of a pair of screws 32. The studs 29 extend laterally either side of the side portions of the lever 23, there being two of the studs provided for the fulcrum axis and two provided for the load pivot axis. The studs are extending inwardly toward each other or outwardly as shown according to the available space and required lateral stability. The studs 29 engage the inner races of the ball bearings 22 and 24 mounted within cup-shaped housings 33 that are clamped in pedestals 34 of the base 25 or in the spider 21. The bearing housings 33 are clamped in position by straps 35 fitting over the housings and held in place by screws 36. The main lever 23, thus, is supported at its one end by the fulcrum bearings 24 and at its other end by the load counterbalancing spring 26 and the spider 21 is hung from the lever 23 by means of the load bearings 22. The bearings 3 and 5, the lever 4 and the spider 2 of the first scale shown in Figure I are similar to the bearings 22 and 24, the lever 23 and the spider 21 of the second scale shown in Figure II, respectively.

The spider 21 is held in an upright position by an ordinary check link 37 one end of which is pivotally connected by means of ball bearings to a leg 38 of the spider 21 and the other end of which is pivotally mounted by means of ball bearings in an adjustable pedestal 39 in the base 25 of the scale.

A dash pot 40 is mounted on the base 25 of the scale and has its plunger 41 pivotally connected to an arm 42 extending from the spider 21. The dash pot 40 serves to prevent continued oscillation of the lever system following a change in load.

A chart 43 (Figure II), which carries appropriate indicia with respect to weight, unit price and computed value of the material to be weighed on the scale, is mounted on a generally rectangular frame 44 which is pivotally attached to the spring supported end of the lever 23 by an upper chart frame flexure ribbon 45 and which is pivotally attached to the end of a chart lever 46 by a pair of flexible joints 20, the chart lever 46 being pivotally attached in turn at its other end to the base of the scale by a second pair of flexible joints 20. The extension of the load counterbalancing spring 26, which is proportional to the load upon the platter, permits the spring supported end of the main lever 23 to drop a distance proportional to the load and this movement is transmitted to the chart 43, directly attached to the lever, to move the chart through equal increments for equal increments of load on the scale. Greatly enlarged images of the indicia on the chart, which is movable with the levers 23 and 46, are projected by means of an optical system that includes a pair of projection lenses 47. The optical system may be generally similar to the one which is shown and described in U.S. Patent No. 2,723,113, issued on November 8, 1955 to D. A. Meeker and to J. M. Sherman, relating to projected indication scales. Such system projects the images onto an ordinary display screen which is not shown but which may be like the one shown and described in said U.S. Patent No. 2,723,113 to be read by a scale operator and/or a customer. The chart 43 consists of a section of a cylinder having a curvature approximating the arcuate path through which the end of the lever 23 moves. This maintains the physical distance between the projection lenses 47 and the chart constant for all positions occupied by the lever during normal weighing operations to keep the system in focus.

Referring to Figure III in particular, the main lever 23 and the chart lever 46 form the opposite sides of a parallelogram 48 in all positions occupied by the levers during normal weighing operations. The main lever side of the parallelogram 48 is represented by the broken line 49 which is drawn from the center of the fulcrum axis stud 29 through the axis of flexure of the upper chart frame flexure ribbon 45 and the chart lever side of the parallelogram is represented by the broken line 50 which is drawn from the axis of flexure of the left-hand flexible joint 20 through the axis of flexure of the right-hand flexible joint 20. The plane of the chart frame 44 forms the right-hand side of the parallelogram 48 as viewed in Figure III and the left-hand side is represented by the broken line 51 which is drawn from the center of the fulcrum axis stud 29 through the axis of flexure of the left-hand flexible joint 20. The indicia-bearing chart 43 and its frame 44 move in an arcuate path along with the ends of the pair of levers 23 and 46. The plane of the chart frame 44, because of the parallelogram geometry, in any position in its arcuate path is parallel to the plane of the chart frame in any one of its other positions in the path. This helps in maintaining the optical projection system in focus. To prevent destruction of the parallelogram 48, the flexible joints 20 are so constructed that their bending spans or zones of flexure remain constant during all positions occupied by the chart lever 46 during normal weighing operations.

One of the flexible joints 20 which provide the check link 16 of the first weighing scale shown in Figure I with pivotal connections at its ends and also the chart lever 46 of the second weighing scale shown in Figures II and III with pivotal connections at its ends is illustrated in detail in Figures IV, V and VI. Such joints or pivotal connections 20 each includes a thin flexible flexure ribbon 52 which may be a highly tempered metallic ribbon. This thin ribbon 52 is suitably reinforced and constrained to flex only on predetermined and unchanging axes by rigid reinforcing plates or guards 53 which for the purpose of preventing sidewise kinking or buckling are provided with offset, overlapping, interdigitated projections 54. The guards 53 are alike and when assembled the projections 54, which are spaced from a zone of flexure or bending span 55 to insure free movement, overlap each other with two of the guards 53 on one side of the ribbon 52 and two of the guards 53 on the other side. When a force tends to deflect the ribbon 52 sidewise, the projections 54 on one side of the ribbon contact the projections on the guards on the other side through the ribbon and thus prevent kinking or buckling of the ribbon under unusual forces.

Except for the overlapping projections 54, the guards 53 are in constant contact with end portions of the ribbons 52 holding and reinforcing each of the ribbons. The overlapping projections 54 are spaced from the center portion or zone of flexure or bending span 55 of each of the ribbons 52 to permit the ribbons to bend only within limits. The guards 53 are improvements over prior guards because, whereas prior guards had curved surfaces on their overlapping projections in juxtaposition with the bending areas of the ribbons which they protected, the improved guards 53 have areas 56 which are so set back or spaced from the bending spans 55 of the ribbons 52 that sharp edges or definite lines of demarcation 58 are provided which separate each overlapping projection 54 from the main body portion or reinforcing portion of the guard 53. The sharp edges 58 provide take-off lines for the ribbons 52, i.e., there is provided definite edges about which the ribbons 52 can flex. Such sharp edges, which define the zones of flexure 55, insure that the effective flexing point of each of the ribbons 52 is determinate and that its bending span 55 remains constant during normal usage. This is in sharp contrast to the prior ribbons which were bent around the radii of the said curved surfaces on the overlapping portions of the prior guards which caused the bending spans of the prior ribbons to change while being bent resulting in destruction of any parallelogram scale structure built upon the prior ribbon devices.

The improved guards 53, thus, provide definite clamp surfaces, i.e., the sharp edges 58, about which a ribbon 52 bends without twisting so that sidewise deflection or change in the bending spans 55 resulting in the destruction of the parallelogram ABCD (Figure I) or of the parallelogram 48 (Figure III) are entirely obviated.

To properly align the guards 53 and the ribbons 52, holes 59 are formed in the ends of the guards and in the ends of the ribbons which are properly aligned by means of pins 60 as illustrated in Figure II, the pins 60 being fixed in the members which are pivotally connected together by the ribbons. Screws 61 which hold pairs of the guards 53 together and which also attach the guards to the several points in the scales also serve to hold the flexure ribbons 52 between the guards in sandwiched form.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. A joint comprising a flexure ribbon and reinforcing guards secured to the ribbon, the guards having overlapping projections overlying and spaced from a zone of flexure of the ribbon to permit the ribbon to bend only within limits and each having a sharp edge defining said zone of flexure and about which the ribbon bends without twisting.

2. A joint comprising a flexure ribbon and members secured to the ribbon, the members having reinforcing portions contacting the ribbon and guard portions overlying and spaced from a bending span of the ribbon, there being sharp lines of demarcation between the portions which define said bending span of the ribbon.

3. A joint comprising a flexure ribbon, means for reinforcing the ribbon, and means for constraining the ribbon to flex only on predetermined and unchanging axes, said means for constraining including pairs of interdigitated projections located one on each side of the ribbon and that have sharp edges defining said axes.

4. In a weighing scale, in combination, a base, a parallelogram structure that is pivotally mounted on the base and that has each of its corners articulated, and a load receiving platter which is so operatively connected to the parallelogram structure that the structure is movable under the influence of loads upon the platter, at least one of the corners of the parallelogram structure being articulated by means of a flexible joint comprising a flexure ribbon and reinforcing guards secured to the ribbon, the guards having overlapping projections overlying and spaced from a zone of flexure of the ribbon to permit the ribbon to bend only within limits and each having a sharp edge defining said zone of flexure and about which the ribbon bends without twisting.

5. In a weighing scale, in combination, a base, a parallelogram structure that is pivotally mounted on the base and that has each of its corners articulated, and a load receiving platter which is so operatively connected to the parallelogram structure that the structure is movable under the influence of loads upon the platter, at least one of the corners of the parallelogram structure being articulated by means of a flexible joint comprising a flexure ribbon and members secured to the ribbon, the members having reinforcing portions contacting the ribbon and guard portions overlying and spaced from a bending span of the ribbon, there being sharp lines of demarcation between the portions which define said bending span of the ribbon.

6. In a weighing scale, in combination, a base, a parallelogram structure that is pivotally mounted on the base and that has each of its corners articulated, and a load receiving platter which is so operatively connected to the parallelogram structure that the structure is movable under the influence of loads upon the platter, at least one of the corners of the parallelogram structure being articulated by means of a flexible joint comprising a flexure ribbon, means for reinforcing the ribbon, and means for constraining the ribbon to flex only on predetermined and unchanging axes, said means for constraining including pairs of interdigitated projections located one on each side of the ribbon and that have sharp edges defining said axes.

References Cited in the file of this patent

UNITED STATES PATENTS

| | | |
|---|---|---|
| 1,225,085 | Wahlen | May 8, 1917 |
| 1,941,849 | Myers et al. | Nov. 17, 1930 |
| 2,013,961 | Hurt | Sept. 10, 1935 |

UNITED STATES PATENT OFFICE
CERTIFICATE OF CORRECTION

Patent No. 2,918,268                                        December 22, 1959

Robert O. Bradley

It is hereby certified that error appears in the printed specification of the above numbered patent requiring correction and that the said Letters Patent should read as corrected below.

Column 3, line 5, for "bearing 3 of the axis" read -- bearing 3 to the axis --.

Signed and sealed this 31st day of May 1960.

(SEAL)
Attest:

KARL H. AXLINE
Attesting Officer

ROBERT C. WATSON
Commissioner of Patents